(12) United States Patent
Park et al.

(10) Patent No.: US 11,208,554 B2
(45) Date of Patent: Dec. 28, 2021

(54) THERMALLY-CONDUCTIVE RESIN COMPOSITION, AND COMPLEX COMPRISING SAME

(71) Applicant: LOTTE ADVANCED MATERIALS CO., LTD., Yeosu-si (KR)

(72) Inventors: Jee Kwon Park, Uiwang-si (KR); Yeong Deuk Seo, Uiwang-si (KR); Jung Ki Kim, Uiwang-si (KR); Yoo Jin Jung, Uiwang-si (KR); Sang Hyun Hong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 246 days.

(21) Appl. No.: 16/473,778

(22) PCT Filed: Dec. 27, 2017

(86) PCT No.: PCT/KR2017/015552
§ 371 (c)(1),
(2) Date: Jun. 26, 2019

(87) PCT Pub. No.: WO2018/124734
PCT Pub. Date: Jul. 5, 2018

(65) Prior Publication Data
US 2019/0338117 A1    Nov. 7, 2019

(30) Foreign Application Priority Data

Dec. 30, 2016    (KR) .................... 10-2016-0184436

(51) Int. Cl.
C08L 69/00    (2006.01)
C09K 5/14    (2006.01)
C23C 18/20    (2006.01)

(52) U.S. Cl.
CPC ............... *C08L 69/00* (2013.01); *C09K 5/14* (2013.01); *C23C 18/20* (2013.01)

(58) Field of Classification Search
None
See application file for complete search history.

(56) References Cited

U.S. PATENT DOCUMENTS

| 8,309,640 B2 | 11/2012 | Li et al. |
| 2013/0313493 A1 | 11/2013 | Wen et al. |
| 2013/0317141 A1 | 11/2013 | Cheng et al. |
| 2013/0317143 A1 | 11/2013 | Daga et al. |
| 2013/0317144 A1 | 11/2013 | Wu et al. |
| 2013/0317145 A1 | 11/2013 | An et al. |
| 2013/0317146 A1 | 11/2013 | Li et al. |
| 2013/0317147 A1 | 11/2013 | Li et al. |
| 2013/0317148 A1 | 11/2013 | Zheng et al. |
| 2014/0296410 A1 | 10/2014 | Cheng et al. |
| 2014/0296411 A1 | 10/2014 | Cheng et al. |
| 2014/0353543 A1 | 12/2014 | Wu et al. |
| 2015/0069290 A1 | 3/2015 | Guo et al. |
| 2016/0311999 A1* | 10/2016 | Jung .................. C08L 23/0869 |
| 2018/0171137 A1 | 6/2018 | Woo et al. |

FOREIGN PATENT DOCUMENTS

| CN | 104292817 A | 1/2015 |
| CN | 105647168 A | 6/2016 |
| JP | 2009-227788 A | 10/2009 |
| JP | 2010-150377 A | 7/2010 |
| KR | 10-2011-0018319 A | 2/2011 |
| KR | 10-2015-0138337 A | 12/2015 |
| KR | 10-2016-0016957 A | 2/2016 |
| KR | 10-2016-0054577 A | 5/2016 |
| KR | 10-2016-0129974 A | 11/2016 |
| WO | 2013/175451 A1 | 11/2013 |
| WO | 2018/124734 A1 | 7/2018 |

OTHER PUBLICATIONS

Office Action in counterpart Chinese Application No. 201780081486.8 dated Dec. 31, 2020, pp. 1-5.
Extended Search Report in counterpart European Application No. 17885825.4 dated Jun. 25, 2020, pp. 1-7.
International Search Report in counterpart International Application No. PCT/KR2017/015552 dated Apr. 9, 2018, pp. 1-4.

* cited by examiner

*Primary Examiner* — Robert T Butcher
(74) *Attorney, Agent, or Firm* — Additon, Pendleton & Witherspoon, P.A.

(57) ABSTRACT

A thermally-conductive resin composition according to the present invention comprises: approximately 10-50 wt % polycarbonate resin; approximately 1-10 wt % glycol-modified polyester resin; approximately 1-15 wt % glass transition temperature depressing agent; approximately 5-20 wt % additive for laser direct structuring; approximately 10-35 wt % boron nitride having average particle size (D50) of approximately 10 μm or greater; and approximately 10-30 wt % glass fiber having a non-circular cross-sectional surface.

13 Claims, 1 Drawing Sheet

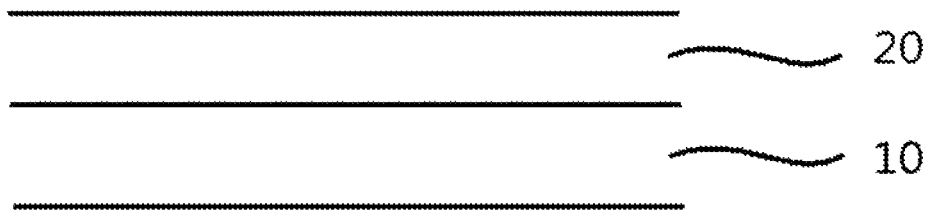

THERMALLY-CONDUCTIVE RESIN COMPOSITION, AND COMPLEX COMPRISING SAME

CROSS-REFERENCE TO RELATED APPLICATIONS

This application claims priority to and the benefit of International Application No. PCT/KR2017/015552, filed Dec. 27, 2017, which published as WO 2018/124734 on Jul. 5, 2018, and a Korean Patent Application No. 10-2016-0184436, filed in the Korean Intellectual Property Office on Dec. 30, 2016, the entire disclosure of each of which is incorporated herein by reference.

TECHNICAL FIELD

The present invention relates to a thermally conductive resin composition and a complex including the same. More particularly, the present invention relates to a thermally conductive resin composition that has good properties in terms of thermal conductivity, plating adhesion and mechanical properties and allows laser direct structuring, and a complex including the same.

BACKGROUND ART

A laser direct structuring (LDS) process may be used to form a metal layer on at least a portion of a surface of a molded product produced from a thermoplastic resin composition. The LDS process is a pretreatment method to modify a plating target region to have suitable properties for plating by irradiating the surface of the molded product with laser beams. To this end, a thermally conductive resin composition for formation of a molded product is required to contain an additive for laser direct structuring, which can form metal nuclei upon irradiation with laser beams. The additive for laser direct structuring is decomposed, thus generating metal nuclei upon irradiation with the laser beams. In addition, a region irradiated with laser beams has a roughened surface. Due to such metal nuclei and surface roughness, the laser-modified region becomes suitable for plating.

Laser direct structuring allows rapid and economic formation of electronic/electric circuits on a three-dimensional molded article. For example, laser direct structuring may be advantageously used in manufacture of antennas for portable electronic devices, radio frequency identification (RFID) antennas, and the like.

In recent years, with increasing tendency of reduction in weight and thickness of products, there is increasing demand for a thermally conductive resin composition which exhibits excellent mechanical properties and molding processability (external appearance). In addition, reduction in thickness of fine patterns (plated region) on a portable electronic device can cause peeling of plating.

Therefore, there is a need for development of a resin composition that has good properties in terms of thermal conductivity, plating adhesion and mechanical properties, and is suitable for laser direct structuring.

The background technique of the present invention is disclosed in Korean Patent Laid-open Publication No. 2011-0018319.

DISCLOSURE

Technical Problem

It is one object of the prevent invention to provide a thermally conductive resin composition that has good properties in terms of thermal conductivity, plating adhesion and mechanical properties.

It is another object of the present invention to provide a thermally conductive resin composition that has low electric conductivity and high thermal conductivity to secure good reliability and is suitable for components of a mobile device.

The above and other objects of the present invention can be achieved by the present invention described below.

TECHNICAL SOLUTION

One aspect of the present invention relates to a thermally conductive resin composition. The thermally conductive resin composition includes: about 10% by weight (wt %) to about 50 wt % of a polycarbonate resin; about 1 wt % to about 10 wt % of a glycol-modified polyester resin; about 1 wt % to about 15 wt % of a glass transition temperature reduction agent; about 5 wt % to about 20 wt % of an agent for laser direct structuring; about 10 wt % to about 35 wt % of boron nitride having an average particle diameter (D50) of 10 μm or more; and about 10 wt % to about 30 wt % of glass fibers having a non-circular cross-section.

In one embodiment, the glycol-modified polyester resin may include about 30% by mole (mol %) to about 100 mol % of 1,4-cyclohexanedimethanol (CHDM) based on the total number of moles of diol components.

In one embodiment, the glass transition temperature reduction agent may include a phenoxy phosphagen oligomer.

In one embodiment, the agent for laser direct structuring may include at least one selected from among a heavy metal composite oxide spinel and a copper salt.

In one embodiment, the boron nitride may have an average particle diameter (D50) of about 10 μm to about 50 μm.

In one embodiment, the glass fiber may have a cross-sectional aspect ratio of about 1.5 to about 10.

In one embodiment, the glycol-modified polyester resin and the glass transition temperature reduction agent may be present in a weight ratio of about 1:2 to about 1:5.

In one embodiment, the glycol-modified polyester resin and the agent for laser direct structuring may be present in a weight ratio of about 1:2 to about 1:6.

In one embodiment, the glycol-modified polyester resin and the boron nitride may be present in a weight ratio of about 1:6 to about 1:15.

In one embodiment, the glass transition temperature reduction agent and the boron nitride may be present in a weight ratio of about 1:2 to about 1:5.

In one embodiment, the thermally conductive resin composition may satisfy Relations 1 and 2:

$$1 W/mK \leq Ct \leq 2 W/mK, \quad \text{[Relation 1]}$$

where Ct denotes thermal conductivity, as measured in accordance with ASTM E1461;

$$6.0 GPa < FM \leq 8.5 GPa, \quad \text{[Relation 2]}$$

where FM denotes flexural modulus, as measured under conditions of 2.8 mm/min in accordance with ASTM D790.

Another aspect of the present invention relates to a composite comprising the thermally conductive resin composition.

In one embodiment, the composite may include a resin layer formed of the thermally conductive resin composition; and a metal layer formed on at least one surface of the resin layer.

In one embodiment, the metal layer may be formed by plating after laser direct structuring.

In one embodiment, the metal layer may be formed in a pattern.

Advantageous Effects

The present invention provides a thermally conductive resin composition that has good thermal conductivity, plating adhesion and mechanical properties, exhibits low electrical conductivity and high thermal conductivity to secure good reliability, and is suitable for components of mobile devices.

DRAWINGS

FIG. 1 is a schematic sectional view of a composite according to one embodiment of the present invention.

BEST MODE

Hereinafter, embodiments of the present invention will be described in detail.

(A) Polycarbonate Resin

According to the present invention, the polycarbonate resin may be selected from any polycarbonate resins used in a typical thermally conductive resin composition. For example, the polycarbonate resin may be an aromatic polycarbonate resin prepared by reacting diphenols (aromatic diol compounds) with a carbonate precursor, such as phosgene, halogen formate, or carbonate diester.

Examples of the diphenols may include 4,4'-biphenol, 2,2-bis(4-hydroxyphenyl)propane, 2,4-bis(4-hydroxyphenyl)-2-methylbutane, 1,1-bis(4-hydroxyphenyl)cyclohexane, 2,2-bis(3-chloro-4-hydroxyphenyl)propane, 2,2-bis(3,5-dichloro-4-hydroxyphenyl)propane, 2,2-bis(3-methyl-4-hydroxyphenyl)propane, and 2,2-bis(3,5-dimethyl-4-hydroxyphenyl)propane, without being limited thereto. For example, the diphenols may be 2,2-bis(4-hydroxyphenyl)propane, 2,2-bis(3,5-dichloro-4-hydroxyphenyl)propane, 2,2-bis(3-methyl-4-hydroxyphenyl)propane, 2,2-bis(3,5-dimethyl-4-hydroxyphenyl)propane, or 1,1-bis(4-hydroxyphenyl)cyclohexane, specifically 2,2-bis(4-hydroxyphenyl) propane which is also referred to as bisphenol A.

Examples of the carbonate precursor may include dimethyl carbonate, diethyl carbonate, dibutyl carbonate, dicyclohexyl carbonate, diphenyl carbonate, ditolyl carbonate, bis(chlorophenyl) carbonate, m-cresyl carbonate, dinaphthyl carbonate, carbonyl chloride (phosgene), diphosgene, triphosgene, carbonyl bromide, bishaloformate, and the like. These may be used alone or as a mixture thereof.

The polycarbonate resin may be a branched polycarbonate resin. For example, the polycarbonate resin may be prepared by adding a tri- or higher polyfunctional compound, specifically, a tri- or higher valent phenol group-containing compound in an amount of 0.05 mol % to 2 mol % based on the total number of moles of the diphenols used in polymerization.

The polycarbonate resin may be a homopolycarbonate resin, a copolycarbonate resin, or a blend thereof. In addition, the polycarbonate resin may be partly or completely replaced by an aromatic polyester-carbonate resin obtained by polymerization in the presence of an ester precursor, for example, a bifunctional carboxylic acid.

In some embodiments, the polycarbonate resin may have a weight average molecular weight (Mw) of about 10,000 g/mol to about 200,000 g/mol, specifically about 15,000 g/mol to about 40,000 g/mol, for example, 15,000 g/mol, 20,000 g/mol, 23,000 g/mol, 25,000 g/mol, 30,000 g/mol, 35,000 g/mol, or 40,000 g/mol, as measured by gel permeation chromatography (GPC). Within this range, the thermally conductive resin composition can have good properties in terms of impact resistance, rigidity, heat resistance, and the like.

In some embodiments, the polycarbonate resin may be present in an amount of about 10 wt % to about 50 wt %, specifically about 30 wt % to about 49 wt %, for example, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, or 49 wt %, in the thermally conductive resin composition. Within this content range, the thermally conductive resin composition can have good properties in terms of mechanical strength, plating adhesion, external appearance, surface hardness, and the like.

(B) Glycol-Modified Polyester Resin

According to the present invention, the glycol-modified polyester resin serves to enhance plating adhesion and external appearance of the thermally conductive resin composition while maintaining rigidity thereof in cooperation with an agent for laser direct structuring.

In some embodiments, the glycol-modified polyester resin may be prepared through polycondensation of a dicarboxylic acid component and a diol component. The diol component may include about 30 mol % to about 100 mol % of 1,4-cyclohexanedimethanol (CHDM), for example, about 35 mol % to about 100 mol %, and about 0 mol % to about 70 mol % of a $C_2$ to $C_6$ alkylene glycol, specifically about 0 mol % to about 65 mol %, for example, 0 mol %, 5 mol %, 10 mol %, 15 mol %, 20 mol %, 25 mol %, 30 mol %, 35 mol %, 40 mol %, 45 mol %, 50 mol %, 55 mol %, 60 mol %, or 65 mol %. Within this content range, the glycol-modified polyester resin can further improve processability and plating adhesion of the thermally conductive resin composition.

In some embodiments, the glycol-modified polyester resin may have an inherent viscosity of about 0.5 dl/g to about 0.8 dl/g, specifically about 0.55 dl/g to about 0.75 dl/g, for example, 0.55 dl/g, 0.6 dl/g, 0.65 dl/g, 0.7 dl/g, or 0.75 dl/g, as measured in an o-chlorophenol solution (concentration: 1.2 g/dl) at 35° C. Within this range, the thermally conductive resin composition can have improvement in miscibility between components thereof while securing good properties in terms of mechanical properties, molding processability (external appearance), surface hardness, and the like.

In some embodiments, the glycol-modified polyester resin may be present in an amount of about 1 wt % to about 10 wt %, specifically about 1 wt % to about 7 wt %, for example, 1 wt %, 2 wt %, 3 wt %, 4 wt %, 5 wt %, 6 wt %, or 7 wt %, in the thermally conductive resin composition. Within this content range, the thermally conductive resin composition can achieve further improvement in terms of external appearance, modulus, and plating adhesion.

(C) Glass Transition Temperature Reduction Agent

The glass transition temperature reduction agent serves to improve plating adhesion and fusion strength with respect to a polycarbonate material by reducing the glass transition temperature of the polycarbonate resin when applied to the polycarbonate resin together with the glycol-modified polyester resin.

The glass transition temperature reduction agent may be a compound represented by Formula 1.

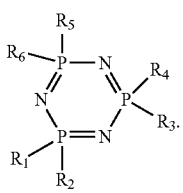

[Formula 1]

where $R_1$, $R_2$, $R_3$, $R_4$, $R_5$ and $R_6$ are each independently selected from among a hydrogen atom, a halogen atom, a hydroxyl group, a substituted or unsubstituted $C_1$ to $C_{20}$ alkyl group, a substituted or unsubstituted $C_2$ to $C_7$ alkenyl group, a substituted or unsubstituted $C_3$ to $C_{20}$ cycloalkyl group, a substituted or unsubstituted $C_2$ to $C_{20}$ hetero-cycloalkyl group, a substituted or unsubstituted $C_1$ to $C_{20}$ alkoxy group, a substituted or unsubstituted $C_6$ to $C_{20}$ aryl group, a substituted or unsubstituted $C_6$ to $C_{20}$ aryloxy group, a substituted or unsubstituted $C_5$ to $C_{20}$ hetero-aryl group, a substituted or unsubstituted $C_1$ to $C_{10}$ alkoxy carbonyl group, a substituted or unsubstituted $C_1$ to $C_{10}$ alkyl carbonyl group, and a substituted or unsubstituted $C_1$ to $C_{10}$ alkyl amino group.

Herein, the "substituted" means that at least one selected from among a $C_1$ to $C_{10}$ alkyl group, a halogen atom, a nitro group, a cyano group, a hydroxyl group, an amino group, a $C_6$ to $C_{10}$ aryl group, a $C_3$ to $C_{10}$ cycloalkyl group, a $C_3$ to $C_{10}$ hetero-cycloalkyl group, and a $C_4$-$C_{10}$ hetero-aryl group is substituted.

In some embodiments, the (C) glass transition temperature reduction agent may include at least one of compounds represented by Formulae 2 to 4.

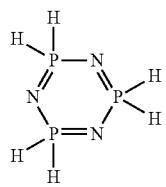

[Formula 2]

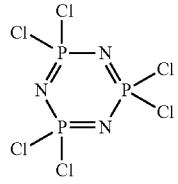

[Formula 3]

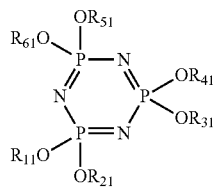

[Formula 4]

In Formula 4, $R_{11}$, $R_{21}$, $R_{31}$, $R_{41}$, $R_{51}$ and $R_{61}$ are each independently a hydrogen atom, a methyl group, an ethyl group, a propyl group, an isopropyl group, a butyl group, a pentyl group, a hexyl group, a phenyl group, a hydroxyphenyl group, or a benzyl group.

In some embodiments, the glass transition temperature reduction agent may be present in an amount of about 1 wt % to about 15 wt %, specifically about 3 wt % to about 10 wt %, for example, 3 wt %, 4 wt %, 5 wt %, 6 wt %, 7 wt %, 8 wt %, 9 wt %, or 10 wt %, in the thermally conductive resin composition. Within this content range, the thermally conductive resin composition can have further improved plating adhesion.

In some embodiments, the glycol-modified polyester resin and the glass transition temperature reduction agent may be present in a weight ratio of about 1:2 to about 1:5, for example, 1:2, 1:2.5, 1:3, 1:3.5, 1:4, 1:4.5, or 1:5 Within this content range, the thermally conductive resin composition can have further improved plating adhesion.

(D) Agent for Laser Direct Structuring

The additive for laser direct structuring (LDS additive) according to one embodiment serves to form metal nuclei upon irradiation with laser beams and may include any typical LDS additives used in resin compositions for LDS.

In some embodiments, the LDS additive may include a heavy metal composite oxide spinel and/or a copper salt.

In some embodiments, the heavy metal composite oxide spinel may be represented by Formula 5.

$$AB_2O_4,$$  [Formula 5]

where A is a metal cation having a valence of 2, for example, magnesium, copper, cobalt, zinc, tin, iron, manganese, nickel, and a combination thereof, and B is a metal cation having a valence of 3, for example, manganese, nickel, copper, cobalt, tin, titanium, iron, aluminum, chromium, and a combination thereof.

In some embodiments, the LDS additive may include copper-iron spinel, copper magnesium aluminum oxide, copper chromium manganese-mixed oxides, copper manganese iron-mixed oxide (in each case optionally having an oxygen vacancy), copper salts and oxides, for example, copper (I) oxide, copper (II) oxide, copper phosphate, copper sulfate, cuprous thiocyanate and metal complex compounds, chelate compounds of copper, tin, nickel, cobalt, silver and palladium, or mixtures of such systems, and/or copper chromium manganese-mixed oxides, copper manganese iron-mixed oxide, copper chromium oxide, zinc iron oxide, cobalt chromium oxide, cobalt aluminum oxide, magnesium aluminum oxide, and mixtures thereof surface-treated forms thereof and/or oxygen bonding forms thereof. More specifically, the LDS additive may include copper hydroxide phosphate, copper chromium oxide spinel, copper phosphate, copper sulfate, cuprous thiocyanate and combinations thereof.

In some embodiments, the LDS agent may be present in an amount of about 5 wt % to about 20 wt %, specifically about 5 wt % to about 10 wt %, for example, 5 wt %, 6 wt %, 7 wt %, 8 wt %, 9 wt %, or 10 wt %, in the thermally conductive resin composition. Within this content range, the thermally conductive resin composition can exhibit good properties in terms of plating adhesion, modulus, surface hardness, external appearance, and the like.

In some embodiments, the glycol-modified polyester resin and the agent for laser direct structuring may be present in a weight ratio of about 1:2 to about 1:6, for example, 1:2, 1:3, 1:4, 1:5, or 1:6. Within this range, the thermally conductive resin composition can have further improved plating adhesion.

(E) Boron Nitride

The boron nitride according to the present invention may have an average particle diameter (D50) of about 10 μm or more, preferably about 10 µm to about 50 µm, for example, 10 µm, 15 µm, 20 µm, 25 µm, 30 µm, 35 µm, 40 µm, 45 µm, or 50 µm. If the boron nitride applied to the resin composition has an average particle diameter (D50) of less than about 10 µm, the composition can suffer from deterioration in thermal conductivity, thereby failing to achieve the objects of the present invention.

In some embodiments, the boron nitride may have a hexagonal structure to impart better thermal conductivity.

In some embodiments, the boron nitride may be present in an amount of about 10 wt % to about 35 wt %, specifically about 10 wt % to about 30 wt %, for example, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, or 30 wt %, in the thermally conductive resin composition. Within this content range, the thermally conductive resin composition can have good properties in terms of thermal conductivity, plating adhesion and modulus.

The glycol-modified polyester resin and the boron nitride may be present in a weight ratio of about 1:6 to about 1:15, for example, 1:6, 1:7, 1:8, 1:9, 1:10, 1:11, 1:12, 1:13, 1:14, or 1:15. Within this content range, the thermally conductive resin composition can have better properties in terms of thermal conductivity, plating adhesion, and modulus.

In addition, the glass transition temperature reduction agent and the boron nitride may be present in a weight ratio of about 1:2 to about 1:5, for example, 1:2, 1:3, 1:4, or 1:5. Within this content range, the glass transition temperature reduction agent and the boron nitride can secure better plating adhesion of the thermally conductive resin composition.

(F) Glass Fiber

The glass fibers according to the present invention are non-circular glass fibers. With such non-circular glass fibers, the thermally conductive resin composition can further improve thermal conductivity as well as mechanical properties such as impact resistance, modulus, and the like.

In some embodiments, the glass fibers may be plate-shaped glass fibers having a cross-sectional aspect ratio (long diameter/short diameter in cross-section) of about 1.5 to about 10, for example, 1.5, 2, 2.5, 3, 3.5, 4, 4.5, 5, 6, 6.5, 7, 7.5, 8, 8.5, 9, 9.5, or 10, and a pre-processing length of about 2 mm to about 5 mm, for example, 2 mm, 3 mm, 4 mm, or 5 mm. Within this range, the glass fibers can further improve thermal conductivity of the thermally conductive resin composition as well as mechanical properties thereof without deterioration in other properties, such as external appearance and the like.

The glass fibers may be present in an amount of about 10 wt % to about 30 wt %, specifically about 15 wt % to about 30 wt %, for example, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, or 30 wt %, in the thermally conductive resin composition. Within this content range, the thermally conductive resin composition can secure modulus and formability.

In some embodiments, the thermally conductive resin composition may further include typical additives commonly used in a typical thermally conductive resin composition without affecting the effects of the present invention, as needed. Examples of the additives may include lubricants, colorants, stabilizers, antioxidants, antistatic agents, and flow enhancers, without being limited thereto. The additives may be present in an amount of about 0.01 parts by weight to about 20 parts by weight relative to 100 parts by weight of the thermally conductive resin composition, for example, 0.01 parts by weight, 0.05 parts by weight, 0.1 parts by weight, 0.5 parts by weight, 1 part by weight, 2 parts by weight, 3 parts by weight, 4 parts by weight, 5 parts by weight, 6 parts by weight, 7 parts by weight, 8 parts by weight, 9 parts by weight, 10 parts by weight, 11 parts by weight, 12 parts by weight, 13 parts by weight, 14 parts by weight, 15 parts by weight, 16 parts by weight, 17 parts by weight, 18 parts by weight, 19 parts by weight, or 20 parts by weight.

The thermally conductive resin composition according to one embodiment of the invention may be prepared in pellet form by mixing the aforementioned components, followed by melt extrusion at about 200° C. to about 300° C., for example, at about 250° C. to about 280° C. in a typical twin-screw extruder.

In some embodiments, the thermally conductive resin composition may satisfy Relations 1 and 2:

$$1 W/mK \le Ct \le 2 W/mK, \qquad \text{[Relation 1]}$$

where Ct denotes thermal conductivity, as measured in accordance with ASTM E1461;

$$6.0 GPa < FM \le 8.5 GPa, \qquad \text{[Relation 2]}$$

where FM denotes flexural modulus, as measured under conditions of 2.8 mm/min in accordance with ASTM D790.

A molded product may be produced using the thermoplastic resin composition by any suitable molding methods, such as injection molding, double injection molding, blowing, extrusion, and thermoforming. The molded product can be easily formed by a person having ordinary skill in the art.

Another aspect of the present invention relates to a composite comprising the thermally conductive resin composition.

In some embodiments, the composite may include a resin layer formed of the thermally conductive resin composition; and a metal layer formed on at least one surface of the resin layer.

FIG. 1 is a schematic sectional view of a composite according to one embodiment of the present invention. It should be understood that sizes of components shown in FIG. 1 are exaggerated for clear description and the present invention is not limited thereto. As shown in FIG. 1, a composite according to the present invention includes a resin layer 10 and a metal layer 20 formed on at least one surface of the resin layer. The metal layer 20 may be formed by plating after laser direct structuring.

The composite may be manufactured by forming a molded product using the thermally conductive resin composition by a method, such as injection molding; irradiating a predetermined region on a surface of the molded product with laser beams; metallizing (plating) the irradiated region to form a metal layer thereon.

In some embodiments, the agent for laser direct structuring in the thermally conductive resin composition is decomposed to form metal nuclei by laser irradiation. In addition, the region irradiated with laser beams has surface roughness suitable for plating. The laser beams may have a wavelength of 248 nm, 308 nm, 355 nm, 532 nm, 1,064 nm or 10,600 nm.

In some embodiments, metallizing may be performed by a typical plating process. For example, the metal layer (electrically conductive path) may be formed on the laser-irradiated region of the surface of the molded product by dipping the molded product subjected to laser irradiation into one or more electroless baths. Examples of electroless plating may include copper plating, gold plating, nickel plating, silver plating, zinc plating, and tin plating, without being limited thereto.

Mode for Invention

Next, the present invention will be described in more detail with reference to some examples. It should be understood that these examples are provided for illustration only and are not to be construed in any way as limiting the present invention.

EXAMPLE

Details of components used in Examples and Comparative Examples are as follows.

(A) Polycarbonate Resin

A bisphenol-A based polycarbonate resin having a weight average molecular weight of 23,000 g/mol was used.

(B) Glycol-Modified Polyester Resin (B1) A glycol-modified polyester resin comprising 1,4-cyclohexanedimethanol (CHDM) (Product Name: Skygreen® S2008, SK Chemicals Co., Ltd.) was used.

(C) Glass Transition Temperature Reduction Agent

A phenoxy phosphagen oligomer (Product Name: Rabitle® FP-110, Fushimi Pharmaceutical Co., Ltd.) was used.

(D) Agent for Laser Direct Structuring $CuCr_2O_4$ (Product Name: Black 1G, Shepherd Color Co., Ltd.) was used.

(E) Boron Nitride (E1) Boron nitride having an average particle diameter (D50) of 15 μm (Product Name: CF-600, Momentive Co., Ltd.) was used.

(E2) Boron nitride having an average particle diameter (D50) of 7.5 μm (Product Name: CFP075, 3M) was used.

(F) Glass Fiber (F1) Glass fiber having a plate-shaped cross-section and an aspect ratio of 2 to 4 (Product Name: CSG 3PA-832, Nittobo Co., Ltd.) was used.
(F2) Glass fiber having a circular cross-section (Product Name: 183F-4P, Owens Corning Co., Ltd.) was used.

Examples 1 to 6 and Comparative Examples 1 to 12

The aforementioned components were weighed in amounts as listed in Tables 1 to 3 and subjected to extrusion in a twin-screw extruder (L/D=36, Φ: 45 mm) at a barrel temperature of 280° C. under conditions of a screw rotational speed of 250 rpm and a self-feeding speed of 25 rpm, thereby preparing thermally conductive resin compositions in pellet form. The prepared pellets were dried at 100° C. for 4 hours or more and subjected to injection molding, thereby preparing specimens. The prepared specimens were subjected to aging for 24 hours and evaluated as to the following properties by the following methods, and evaluation results are shown in Tables 1 to 3.

Property Evaluation (1) Thermal conductivity (W/mK): In-plane thermal conductivity was measured in accordance with ASTM E1461.
(2) Flexural modulus (GPa): Flexural modulus was measured on a 6.4 mm thick specimen at 2.8 mm/min in accordance with ASTM D790.
(3) Plating adhesion (Number): A specimen was plated in an area of 3 cm×3 cm and left under constant temperature/humidity conditions (85° C./85%) for 72 hours, followed by forming 36 grid-lattices separated from each other by a distance of 5 mm by cross-cutting in the longitudinal and transverse directions. Thereafter, plating adhesion was evaluated based on the number of grid-lattices remaining on the plated region of the specimen upon detachment of a 3M tape therefrom.

TABLE 1

| | Item | Example 1 | Example 2 | Example 3 | Example 4 | Example 5 | Example 6 |
|---|---|---|---|---|---|---|---|
| | (A) | 43 | 48 | 48 | 46 | 39 | 50 |
| | (B) | 2 | 2 | 2 | 2 | 3 | 1 |
| | (C) | 5 | 5 | 5 | 5 | 8 | 5 |
| | (D) | 10 | 10 | 10 | 7 | 10 | 5 |
| (E) | (E1) | 20 | 15 | 20 | 20 | 20 | 10 |
| | (E2) | — | — | — | — | — | — |
| (F) | (F1) | 20 | 20 | 15 | 20 | 20 | 29 |
| | (F2) | — | — | — | — | — | — |
| Thermal conductivity (W/mK) | | 1.3 | 1.1 | 1.2 | 1.2 | 1.2 | 1.1 |
| Flexural modulus (GPa) | | 7.8 | 7.5 | 7.1 | 7.5 | 7.6 | 8.2 |
| Plating adhesion (number) | | 28 | 29 | 28 | 27 | 33 | 26 |

TABLE 2

| | Item | Comp. Example 1 | Comp. Example 2 | Comp. Example 3 | Comp. Example 4 | Comp. Example 5 | Comp. Example 6 |
|---|---|---|---|---|---|---|---|
| | (A) | 58 | 60 | 65 | 50 | 58 | 51 |
| | (B) | — | — | — | — | 2 | 2 |
| | (C) | — | — | — | — | 5 | 5 |
| | (D) | 2 | 10 | 10 | 10 | 10 | 2 |
| (E) | (E1) | 20 | 5 | 20 | 20 | 20 | 20 |
| | (E2) | — | — | — | — | — | — |
| (F) | (F1) | 20 | 25 | 5 | 20 | 5 | 20 |
| | (F2) | — | — | — | — | — | — |
| Thermal conductivity (W/mK) | | 1.3 | 0.6 | 1.2 | 1.3 | 1.2 | 1.3 |
| Flexural modulus (GPa) | | 7.0 | 6.3 | 4.8 | 7.2 | 4.8 | 7.1 |
| Plating adhesion (number) | | Plating failed | 12 | 15 | 10 | 30 | Plating failed |

TABLE 3

| | Item | Comp. Example 7 | Comp. Example 8 | Comp. Example 9 | Comp. Example 10 | Comp. Example 11 | Comp. Example 12 |
|---|---|---|---|---|---|---|---|
| | (A) | 43 | 43 | 8 | 40 | 35 | 20 |
| | (B) | 2 | 2 | 1 | 15 | 2 | 5 |
| | (C) | 5 | 5 | 1 | 5 | 18 | 15 |
| | (D) | 10 | 10 | 20 | 5 | 5 | 10 |
| (E) | (E1) | — | 20 | 35 | 15 | 15 | 40 |
| | (E2) | 20 | — | — | — | — | — |
| (F) | (F1) | 20 | — | 35 | 20 | 25 | 10 |
| | (F2) | — | 20 | — | — | — | — |
| Thermal conductivity (W/mK) | | 0.9 | 1.1 | Extrusion failed | Extrusion failed | Extrusion failed | 1.7 |
| Flexural modulus (GPa) | | 7.5 | 7.6 | Extrusion failed | Extrusion failed | Extrusion failed | 6.5 |
| Plating adhesion (number) | | 28 | 21 | Extrusion failed | Extrusion failed | Extrusion failed | 22 |

From the results shown in Table 1, it can be seen that the thermally conductive resin composition according to the present invention has good properties in terms of thermal conductivity, flexural modulus and plating adhesion. Conversely, the compositions of Comparative Examples 1 to 4 free from the glycol-modified polyester resin and the glass transition temperature reduction agent suffered from deterioration in thermal conductivity or flexural modulus, and the composition of Comparative Example 1 did not allow plating. In addition, the composition of Comparative Example 5 prepared using an excess of glass fibers suffered from deterioration in flexural modulus, and the composition of Comparative Example 6 prepared using a smaller amount of the agent for laser direct structuring than the composition according to the present invention did not allow plating. In addition, it could be seen that the composition of Comparative Example 7 prepared using boron nitride having an average particle diameter out of the range of the present invention suffered from significant deterioration in thermal conductivity. Further, it could be seen that the composition of Comparative Example 8 prepared using glass fibers having a circular cross-sectional shape suffered from deterioration in plating adhesion. Further, the composition of Comparative Example 9 prepared using an excess of non-circular glass fibers did not allow extrusion. The compositions of Comparative Examples 10 and 11 prepared using an excess of the glycol-modified polyester resin or the glass transition temperature reduction agent did not allow extrusion, and the composition of Comparative Example 12 prepared using an excess of boron nitride suffered from deterioration in plating adhesion.

It should be understood that various modifications, changes, alterations, and equivalent embodiments can be made by those skilled in the art without departing from the spirit and scope of the present invention.

The invention claimed is:

1. A thermally conductive resin composition comprising:
   about 10 wt % to about 50 wt % of a polycarbonate resin;
   about 1 wt % to about 10 wt % of a glycol-modified polyester resin;
   about 1 wt % to about 15 wt % of a glass transition temperature reduction agent;
   about 5 wt % to about 20 wt % of an agent for laser direct structuring;
   about 10 wt % to about 35 wt % of boron nitride having an average particle diameter (D50) of about 10 μm or more; and
   about 10 wt % to about 30 wt % of glass fibers having a non-circular cross-section,
   wherein the glycol-modified polyester resin and the agent for laser direct structuring are present in a weight ratio of about 1:2 to about 1:6.

2. The thermally conductive resin composition according to claim 1, wherein the glycol-modified polyester resin comprises about 30 mol % to about 100 mol % of 1,4-cyclohexanedimethanol (CHDM) based on the total number of moles of diol components.

3. The thermally conductive resin composition according to claim 1, wherein the glass transition temperature reduction agent comprises a phenoxy phosphagen oligomer.

4. The thermally conductive resin composition according to claim 1, wherein the agent for laser direct structuring comprises a heavy metal composite oxide spinel and/or a copper salt.

5. The thermally conductive resin composition according to claim 1, wherein the boron nitride has an average particle diameter (D50) of about 10 μm to about 50 μm.

6. The thermally conductive resin composition according to claim 1, wherein the glass fibers have a cross-sectional aspect ratio of about 1.5 to about 10.

7. The thermally conductive resin composition according to claim 1, wherein the glycol-modified polyester resin and the glass transition temperature reduction agent are present in a weight ratio of about 1:2 to about 1:5.

8. The thermally conductive resin composition according to claim 1, wherein the glycol-modified polyester resin and the boron nitride are present in a weight ratio of about 1:6 to about 1:15.

9. The thermally conductive resin composition according to claim 1, wherein the glass transition temperature reduction agent and the boron nitride are present in a weight ratio of about 1:2 to about 1:5.

10. The thermally conductive resin composition according to claim 1, wherein the thermally conductive resin composition satisfies Relations 1 and 2:

$$1 W/mK \leq Ct \leq 2 W/mK,$$ [Relation 1]

where Ct denotes thermal conductivity, as measured in accordance with ASTM E1461;

$$6.0 GPa < FM \leq 8.5 GPa,$$ [Relation 2]

where FM denotes flexural modulus, as measured under conditions of 2.8 mm/min in accordance with ASTM D790.

11. A composite comprising:
a resin layer formed of the thermally conductive resin composition according to claim 1; and
a metal layer formed on at least one surface of the resin layer.

12. The composite according to claim 11, wherein the metal layer is formed by plating after laser direct structuring.

13. The composite according to claim 11, wherein the metal layer is formed in a pattern.

* * * * *